July 14, 1936. P. W. FORREST 2,047,865
DEVICE FOR SUCCESSIVELY EXHIBITING SPACED
NAMES, ADVERTISEMENTS AND THE LIKE
Filed Feb. 1, 1935 5 Sheets-Sheet 1

July 14, 1936.       P. W. FORREST       2,047,865
DEVICE FOR SUCCESSIVELY EXHIBITING SPACED
NAMES, ADVERTISEMENTS AND THE LIKE
Filed Feb. 1, 1935       5 Sheets-Sheet 2

Inventor:
Peter Wilson Forrest
by Calvert Kahn
Attorneys.

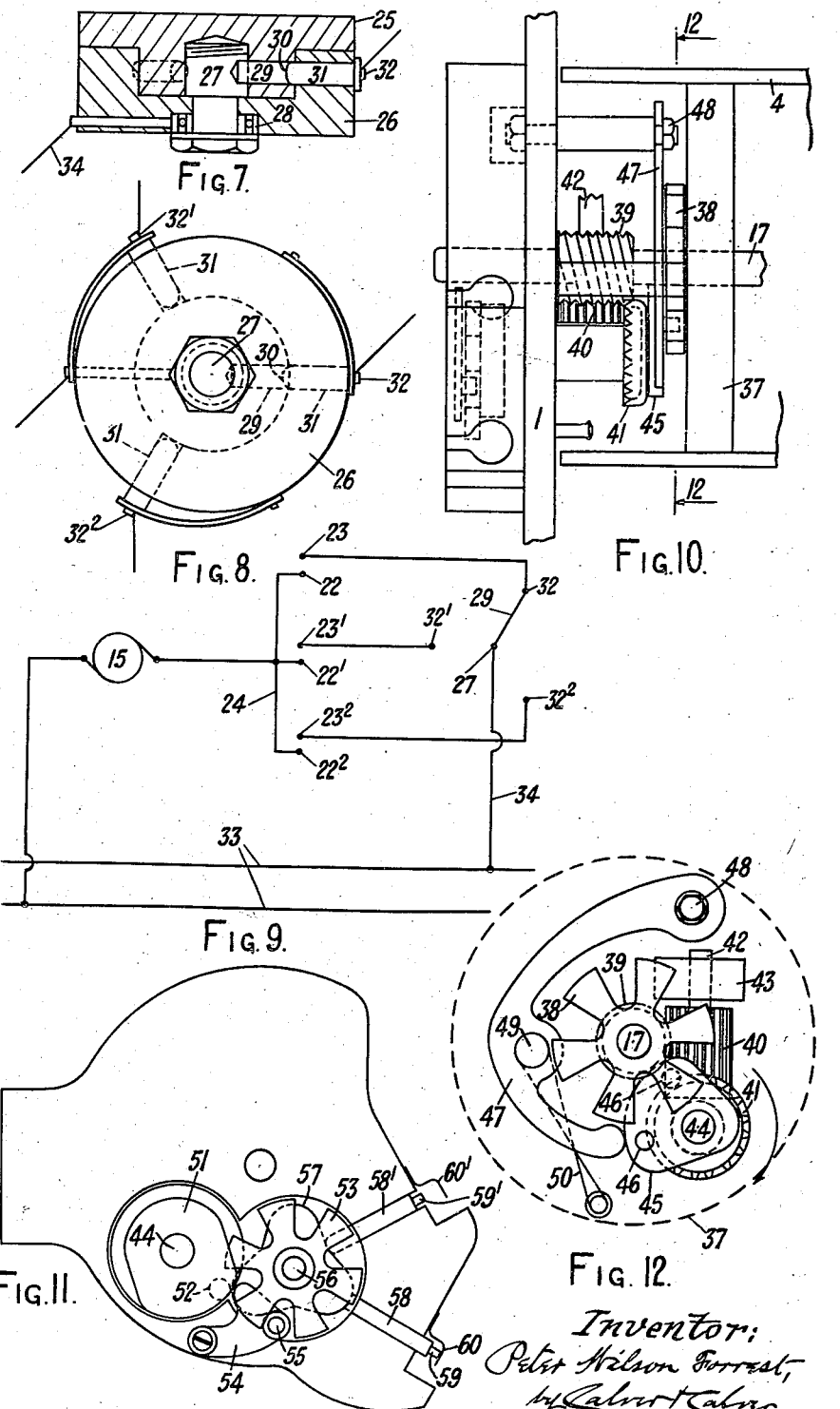

July 14, 1936. P. W. FORREST 2,047,865
DEVICE FOR SUCCESSIVELY EXHIBITING SPACED
NAMES, ADVERTISEMENTS AND THE LIKE
Filed Feb. 1, 1935 5 Sheets-Sheet 4

Inventor:
Peter Wilson Forrest
by Calvert Calvert
Attorneys.

Patented July 14, 1936

2,047,865

UNITED STATES PATENT OFFICE 2,047,865

DEVICE FOR SUCCESSIVELY EXHIBITING SPACED NAMES, ADVERTISEMENTS, AND THE LIKE

Peter Wilson Forrest, Shettleston, Glasgow, Scotland

Application February 1, 1935, Serial No. 4,591
In Great Britain February 5, 1934

6 Claims. (Cl. 40—53)

The invention relates to devices for successively exhibiting spaced names, advertisements and the like, for example, route and destination indicators for vehicles, particularly motor road vehicles, and has for an object to provide an improved device whereby the name of the next station or place of interest, or the route on which the vehicle is travelling, or an advertisement may be exhibited or indicated.

A device for successively exhibiting spaced names, advertisements and the like, according to the invention, incorporates a drum, an electric motor mounted within and adapted to rotate said drum and means including a switch adapted, when actuated, to close the motor circuit and thereby effect rotary movement of the drum through an angle corresponding to the spacing of the matter to be exhibited.

In the accompanying drawings, Fig. 1 is a sectional elevation, partly diagrammatic, of a device according to an embodiment of the invention. Fig. 2 is a fragmentary front view of one end of the device shown by Fig. 1. Fig. 3 is a diagrammatic side view of another embodiment of the invention. Fig. 4 is a front view, showing the front wall of an enclosing casing partly broken away, of the device shown by Fig. 3. Fig. 5 is a plan view partly in section and Fig. 6 is an end view of the device shown by Figs. 3 and 4. Figs. 7 and 8 are, respectively, a sectional elevation and an inverted plan view of a switch hereinafter referred to and Fig. 9 is an electrical diagram of the motor circuit.

Fig. 10 is a fragmentary elevation of a modification of the invention hereinafter referred to. Figs. 11 and 12 are, respectively, an end view and a section taken on the line 12—12 of Fig. 10.

The device illustrated includes a casing 1 constructed to contain the indicator mechanism and having a wall 2 presenting a window opening 3.

The casing is adapted to be secured in a convenient position inside a vehicle or against a wall or the like of a building.

A drum 4 is mounted for rotation inside the casing 1, desirably, on a horizontal axis.

Figure 2:
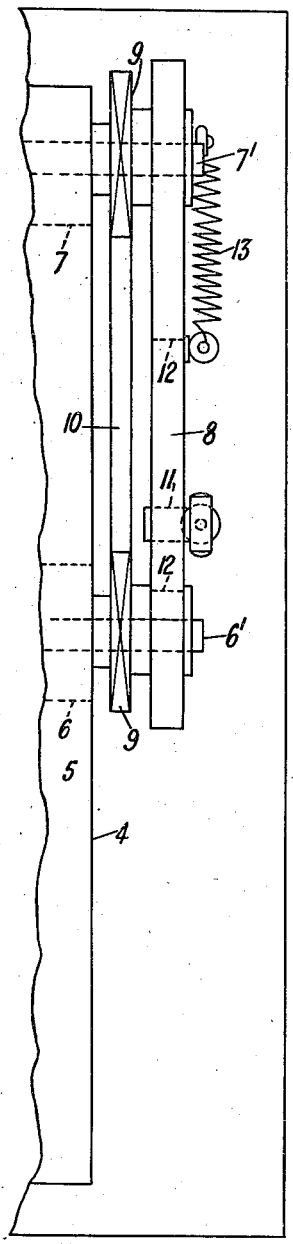
Figure 1:
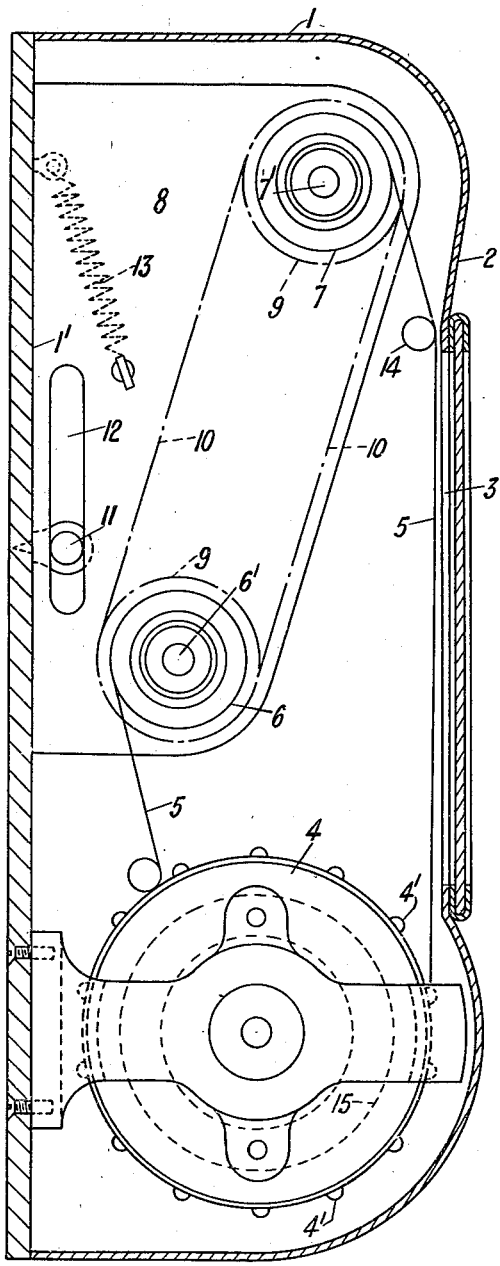

According to the embodiment of the invention illustrated by Figs. 1 and 2, a band 5, trained over the drum 4, is adapted to be wound on and unwound from a pair of spaced rollers 6 and 7 secured on spindles 6' and 7' carried by brackets 8 mounted to slide against the rear wall 1' of the casing 1. The spindles 6' and 7' are provided with sprocket wheels 9 wrapped by an endless chain 10 whereby the rollers 6 and 7 rotate together.

To compensate for the varying diameters of the rollers 6 and 7 as the band 5 is wound thereon and unwound therefrom, pins 11, which may be provided with anti-friction rollers, are assembled to operate in slots 12 formed in the brackets 8, and springs 13 are assembled to urge the brackets 8 in the direction away from the drum 4.

One bracket 8 only is shown in Fig. 2, but it is to be understood that a similar spring-urged slotted bracket and co-operative pin are provided to carry the other ends of the rollers 6 and 7. A guide roller 14 is provided so that the band 5, in its travel, passes in close proximity to the window opening 3.

Figure 3:
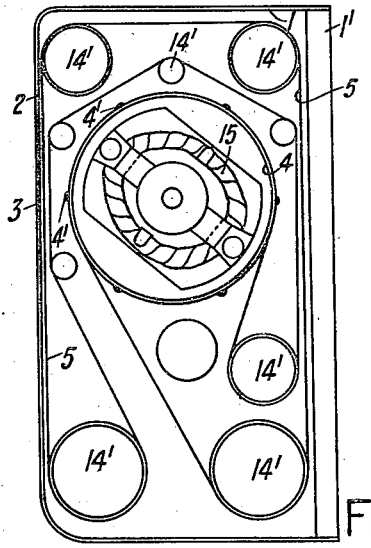
Figure 6:
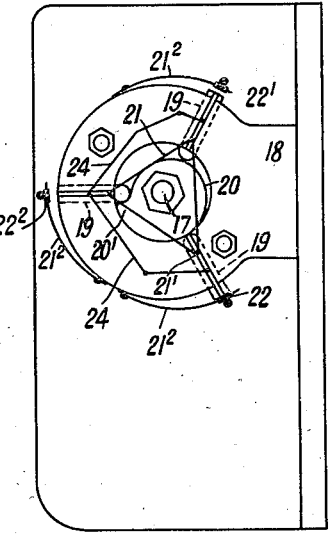
Figure 4:
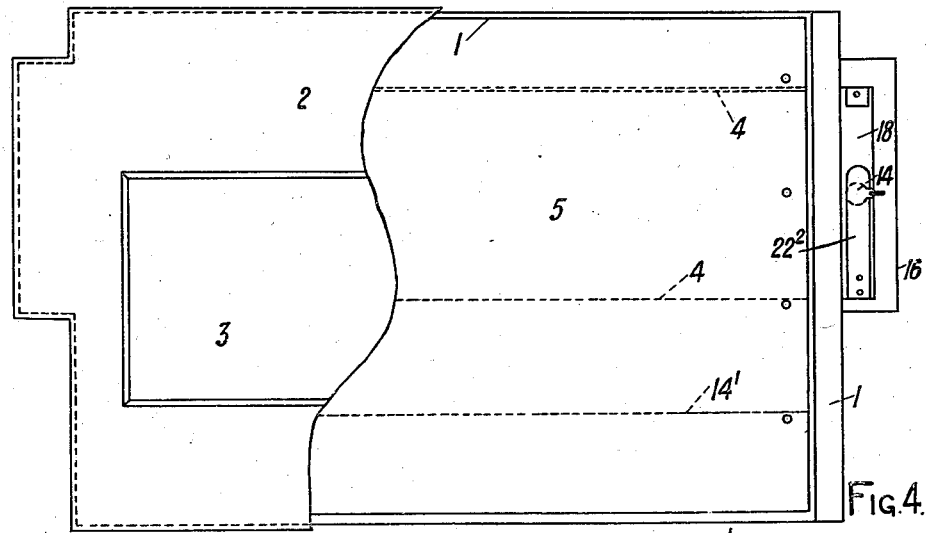
Figure 5:
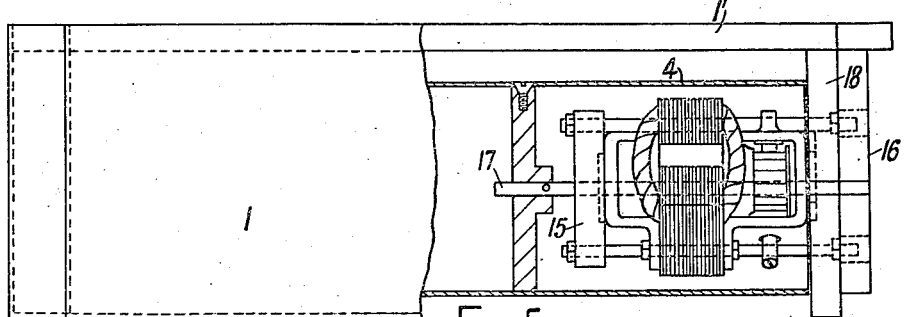

According to the embodiment of the invention illustrated by Figs. 3 and 4, the band 5 is an endless band and is trained over the drum 4 and guide rollers 14'. Desirably, the edges of the band 5 are provided with spaced holes adapted to be engaged by projections or the like 4' presented by the drum. Guide rollers may be located adjacent to the drum to ensure that the projections enter the holes in the band.

In the case of a route and destination indicator for vehicles, the band 5 may contain, at spaced distances, the names of the stations or places of interest on the route to be travelled by the vehicle, or may contain a map of the district through which the vehicle is to travel with the route clearly indicated, it may be by a thick line or otherwise. In the case of an advertising display device the band 5 may contain advertisements arranged at spaced distances apart.

If desired, the band 5 may sleeve the drum 4, the guide rollers being dispensed with, or the name or other matter to be exhibited may be painted on the drum, the band being dispensed with.

A driving electric motor 15 is located within the drum 4.

One end of the motor shaft 17 may be carried by a bracket or the like 16 presenting a stationary end wall for the drum 4 and the other end of the motor shaft 17 may be secured to a disc or like member 35 secured to the drum 4.

A bracket 18, located adjacent to the stationary end wall 16 of the drum 4, carries a plurality of circumferentially-spaced axially movable pins 19 adapted to track a cam 20 carried by the motor shaft 17. These pins are spring-urged, it may be by means of an elastic band 21 stretched over projections 21' on the pins 19, so that, in tracking the cam 20 as the motor shaft 17 is rotated, the pins 19 are moved axially outwards.

The outer ends of the pins 19 present contacts which are co-operative with contacts 22, 22' and 22², desirably carried by blade springs 21², and included in an electric circuit which also includes a switch and the motor 15. The said pins are electrically connected, as indicated by the line 24.

When the motor is stopped, one of said pins 19 is held in the "out" position by the cam 20 so that the contact 22 associated with said pin is closed and the other pins 19 are held in the "in" position by the cam 20 so that the contacts 22' and 22² associated therewith are open.

When the motor 15 is started, by closure of the switch, the motor shaft 17 carrying the cam 20 rotates until the nose 20' of the cam passes the inner end of the pin which is "out" whereby said pin moves in and opens the contacts 22 associated therewith so that the circuit is broken and the motor stops. When the motor stops, the next pin 19 has been moved "out" by the cam 20, so that the contacts 21' associated therewith are closed.

Desirably, and as illustrated by Figs. 7 and 8, the switch includes a manually rotatable component 25 and a stationary component 26, the component 25 being provided with a central pin 27 which penetrates the component 26 and may be provided with ball or like bearings 28.

A pin 29 extends radially from the pin 27 and is provided in its outer end with a recess 30 which is adapted to co-operate with the inner end of one or other of a plurality of spring-urged axially movable pins 31 carried by the component 26. The outer ends of the pins 31 present terminals 32, 32' and 32² desirably carried by blade springs 36 which tend to force the pins 31 radially inwards. From said terminals 32, 32' and 32² connections are taken to the contacts 22, 22' and 22², respectively.

Normally, the radial pin 29 contacts with one of the pins 31. As shown by Figs. 6, 7, 8 and 9, contact 22 is closed and the pin 29 is contacting with the pin 31 of terminal 32 which is connected to contact 22. Current flows from the main circuit 33 through the connection 34, pins 27, 29, 31, terminal 32, contact 22, through the motor 15 back to the main circuit 33, whereby the motor shaft 17 carrying the cam 20 moves angularly until the nose 20' passes the inner end of the pin 19 associated with the contact 22, whereby said contact is opened.

The motor 15 stops when the contact 22 is opened, the circuit being broken. Simultaneously with the opening of contact 22, the cam 20 closes contact 22'.

When the operator moves the component 25 of the switch angularly so that the pin 29 contacts with the pin 31 associated with the terminal 32' which is connected to contact 22', the motor again starts and the cycle is repeated, the motor shaft 17 turning angularly or partially rotating through an arc the length of which is determined by the spacing of the pins 19 which corresponds to the spacing of the matter contained on the band 5.

According to the embodiment of the invention illustrated by Figs. 10, 11 and 12, which is suitable particularly for large indicators, the drum 4 is not directly connected to the motor shaft 17 but the motor shaft 17 passes freely through a disc or the like 37 secured within the drum 4. A star wheel 38, which may have six arms, is mounted to rotate freely on the motor shaft 17 and is secured against a face of the disc or like member 37. A worm 39 secured on the motor shaft 17 engages a worm wheel 40 which, in turn, engages a toothed wheel 41. Conveniently, the teeth of said toothed wheel 41 project laterally from a side of the wheel and the worm wheel 40 is mounted on a spindle 42 carried by a bracket 43 secured to the frame or casing 1 of the device. The toothed wheel 41 is secured on a cam shaft 44 carried by the frame or casing 1 of the device and a cam 45, secured on said shaft 44, is provided with spaced laterally projecting pins 46 adapted to engage the arms of the star wheel 38.

To co-operate with the star wheel 38 having six arms, there are two pins 46 projecting from the cam 45 and these two pins are spaced so as to engage successively two arms of the star wheel so as to move said wheel through an angle of 60 degrees and then move out of engagement with said arms.

The cam 45 is tracked by a lever 47 which is pivoted at 48 to the frame 1 of the device and carries a spring-urged stop pin 49 adapted to be moved into and out of engagement with the star wheel 38.

In operation, when the motor 15 is started, the cam 45 is rotated by means of the worm 39, worm wheel 40 and toothed wheel 41 whereby the cam first swings the lever 47 to move the stop pin 49 out of engagement with the star wheel 38. The pins 46 carried by the cam 45 now rotate the star wheel 38, and therefore the drum 4, through an angle of 60 degrees and pass out of engagement with the star wheel 38. The cam 45 now passes from the lever 47 which, under the influence of the spring 50, swings the stop pin 49 into engagement with and locks the star wheel 38 and drum 4 against further rotation, the cam shaft 44 continuing to rotate.

The cam shaft 44 carries a second cam 51 having a laterally projecting pin 52 adapted to engage successively the arms of a second star wheel 53 having six arms, so that said wheel 53 is rotated through an angle of 30 degrees for each revolution of the cam 51. The cam 51 is tracked by a spring-urged lever 54 which carries a stop pin 55 adapted to be moved into and out of engagement with the star wheel 53. A spindle 56, on which the star wheel 53 is secured, carries a third cam 57 adapted to be tracked by the inner ends of a pair of spaced axially movable pins 58, 58', the outer ends of which present contacts 59, 59' adapted to co-operate with contacts 60, 60' included in an electric circuit which also includes the switch hereinbefore described but designed with two contact positions or the circuit may include an ordinary two-way switch.

In operation, the star wheel 53 rotates through angle of 30 degrees for one revolution of the cam 51, so that one axially movable pin 58 is moved outwards to make contact with its associated contacts 59, 60 and the other pin 58' is moved inwards to open its associated contacts 59', 60'.

Opening the contacts associated with one pin 58 or 58' breaks the circuit and stops the motor 15 and closing the contacts associated with the other pin 58' or 58 enables the circuit to be completed when the switch is actuated.

Figure 13:
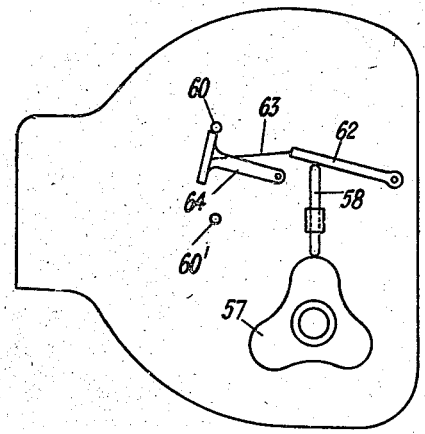
Fig. 13 is a diagrammatic fragmentary end view of a further modification.

Alternatively, and as illustrated diagrammatically by Fig. 13, one axially movable pin 58, instead of the two pins 58, 58' of the embodiment illustrated by Fig. 11, may be assembled to track the cam 57. The pin 58 co-operates with a lever 62 connected by a blade spring 63 to a contact lever 64 adapted to contact with either of the contacts 60 or 60'.

In the case of the device of the invention being applied to railway vehicles having doors or gates which are closed before the vehicle leaves a station, the movable component of the switch may be operatively connected to the door or gate, so that closure of the door or gate moves the movable component whereby the name of the next station is exhibited by the device.

Figure 14:
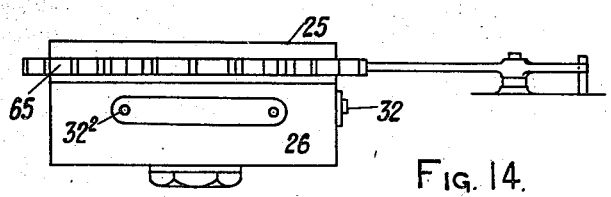
Figs. 14 and 15 are, respectively, an elevation and a corresponding plan view of the switch illustrated by Figs. 6 and 7 provided with means for changing the direction of rotation of the driving motor.
Figure 15:
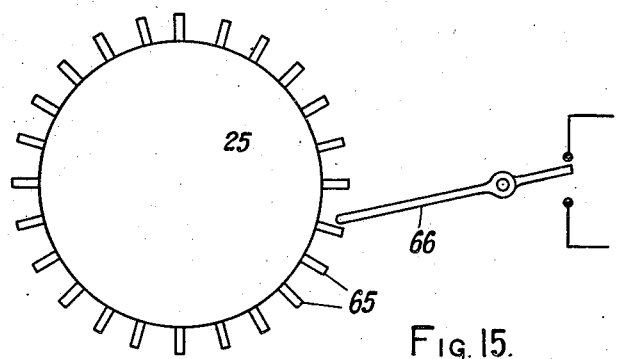

In order that the direction of rotation of the motor may be reversed, the movable component 25 of the switch may be provided with teeth or projections 65 (Figs. 14 and 15) which are co-operative with a spring-urged lever 66 adapted to contact with one or other of a pair of contacts 67. The contacts 67 are connected one to each coil of a motor having a pair of oppositely wound coils. The assembly is such that when the component 25 is rotated in a clockwise direction, the lever 66 is maintained in contact with one contact 67 and when the component 25 is rotated in an anti-clockwise direction, the lever 66 is moved to contact with the other contact 67 whereby the direction of rotation of the motor is changed.

Figure 16:
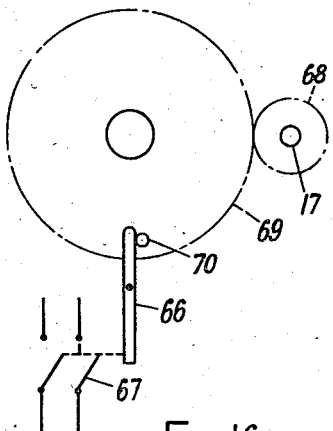
Fig. 16 is a diagrammatic fragmentary elevation of a device for changing the polarity of the motor circuit.

Alternatively, and as illustrated by Fig. 16, the polarity of the motor circuit may be changed so as to reverse the direction of rotation of the drum 4 by means including a pinion 68 which is secured on the motor shaft 17 and gears with a wheel 69 provided with a laterally projecting pin 70, the ratio of the gears being such that one revolution of the wheel 69 corresponds to the length of the band. The pin 70 is adapted to engage a switch lever 66 so that, when moved by the pin 70, the switch lever 66 actuates a pole-changing switch 67 and thereby changes over the polarity of the motor circuit.

Figure 17:
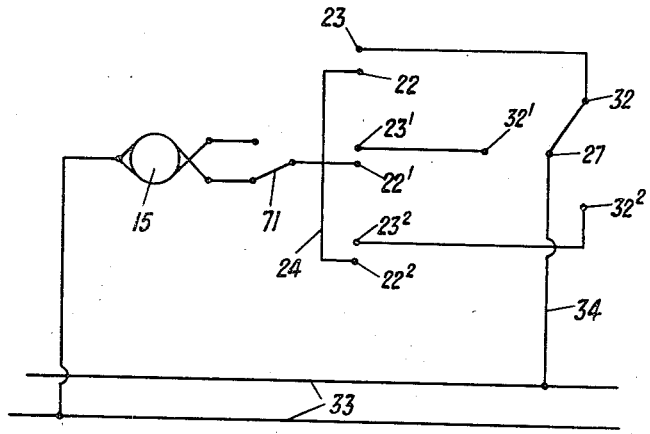
Fig. 17 is a diagram of an electric circuit which includes a switch for changing the polarity of the motor circuit.

If desired, and as illustrated diagrammatically by Fig. 17, the motor 15 may be provided with oppositely wound coils so that the change of direction of rotation may be obtained by means of a switch 71.

Figure 18:
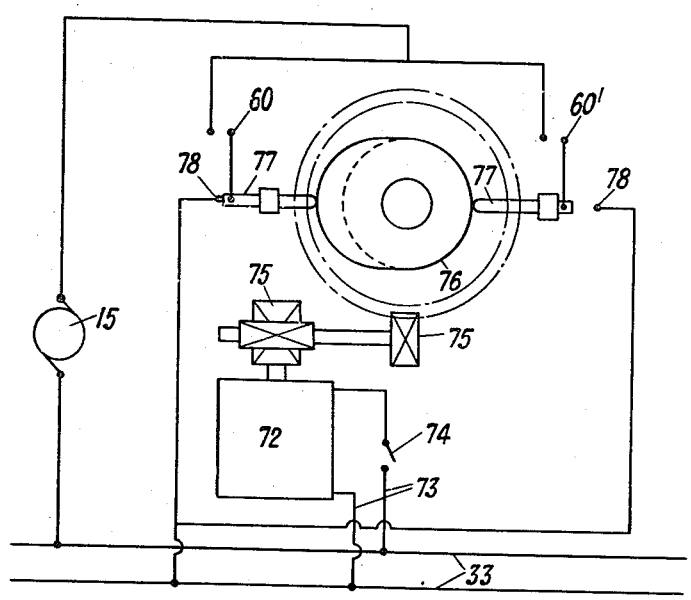
Fig. 18 is a diagram illustrating an assembly of parts for automatically actuating the apparatus.

An automatic device, illustrated by Fig. 18, may be substituted for the switch illustrated by Figs. 7 and 8.

A motor 72, included in a circuit 73 provided with a switch 74, drives, by means including worm and worm wheel reduction gearing 75, a cam 76 adapted to be tracked by two endwise movable rods 77, the ends of which present contacts adapted to co-operate with contacts 78 connected to the main circuit 33. Connections are taken from the rods 77 to the contacts 60, 60'.

In operation, closure of the switch 74 energizes the circuit 73 of the motor 72 whereby the cam 76 is constantly rotated. The contacts 78 are closed alternately by the movement of the rods 77 so that the circuit of the motor 15 is closed and opened by the alternate closure and opening of the contacts 60, 60'.

I claim:—

1. For successively exhibiting spaced names, advertisements and the like, a device which incorporates a casing, a drum mounted for rotation within said casing, a shaft extending axially within said drum, an electric motor mounted on said shaft and within said drum, means whereby rotation of the shaft effects rotary movement of the drum, an electric circuit which includes said motor, a switch adapted, when actuated, to close said circuit and thereby effect rotary movement of said shaft and drum, co-operative contacts included in said circuit, a cam driven by said shaft and means operable by said cam for opening said contacts when said shaft has rotated through a predetermined angle and thereby effect stoppage of the shaft and drum.

2. A device as claimed in claim 1 in which the means whereby rotation of the motor shaft effects rotary movement of the drum comprises a cam adapted to be rotated from the motor spindle by means including worm and worm wheel gearing, a star wheel secured to the drum, pins carried by said cam and adapted to rotate said star wheel and drum and a stop pin adapted to prevent rotation of the star wheel, said stop pin being carried by a lever, operable by said cam, the assembly being such that a step-by-step rotary movement is imparted to the drum.

3. For successively exhibiting spaced names, advertisements and the like, a device which incorporates a casing, a drum mounted for rotation within said casing, a shaft extending axially within said drum, an electric motor mounted on said shaft and within said drum, means whereby rotation of the shaft effects rotary movement of the drum, an electric circuit which includes said motor, a switch adapted, when actuated, to close said circuit and thereby effect rotary movement of said shaft and drum, a cam driven by the motor spindle, spaced axially movable pins arranged to track said cam, contacts presented by said pins and contacts included in the electric circuit which includes the motor, said contacts being co-operative to open the electric circuit when the motor shaft has rotated through a predetermined angle and thereby effect stoppage of the drum.

4. For successively exhibiting spaced names, advertisements and the like, a device which incorporates a casing, a drum mounted for rotation within said casing, a shaft extending axially within said drum, an electric motor mounted on said shaft and within said drum, means whereby rotation of the shaft effects rotary movement of the drum, electric circuits which include said motor, a switch including a rotary component and a stationary component adapted, on step-by-step rotation of the movable component, to close each electric circuit in succession, pairs of co-operative contacts included in said circuits, a cam driven by the motor spindle, movable pins arranged to track said cam and operate the said contacts to open the circuit which has been closed by operation of the switch after the motor shaft has rotated through a predetermined angle.

5. For successively exhibiting spaced names, advertisements and the like, a device which incorporates a casing, a drum mounted for rotation within said casing, a shaft extending axially within said drum, an electric motor mounted on said shaft and within said drum, means whereby rotation of the shaft effects rotary movement of the drum, an electric circuit which includes said motor, a plurality of terminal contacts included in said circuit, a plurality of movable contacts, each movable contact being associated with a terminal contact, means driven from the motor shaft for moving in succession each movable contact into contact with its associated terminal contact, a rotary switch presenting a plurality of non-rotary contacts each of which is electrically connected to one of the aforesaid movable contacts, and a rotary contact also included in said switch and adapted to co-operate in succession with each of said non-rotary contacts.

6. A device as claimed in claim 1 in which the cam is driven by the motor shaft by means comprising a star wheel secured on the cam spindle and adapted to be rotated by means of a pin which projects laterally from the face of a second cam adapted to be rotated from the motor shaft by worm and worm wheel gearing, a stop pin carried by a lever arranged to track said second cam being co-operative with said star wheel.

PETER WILSON FORREST.